UNITED STATES PATENT OFFICE 2,389,127

SULPHONES AND PROCESS OF PREPARING SAME

Louis L. Bambas, Grosse Pointe Woods, Mich., assignor to Parke, Davis & Company, Detroit, Mich., a corporation of Michigan No Drawing. Application June 13, 1944,
Serial No. 540,136

6 Claims. (Cl. 260—239.6)

The invention relates to the preparation of sulphones in which an aryl radical either substituted or unsubstituted and a thiodiazolyl radical are united to the sulphone group.

One of the objects of the invention is to obtain compounds of therapeutic importance, particularly for the treatment of bacterial infections including pneumococcal and streptococcal infections.

Another object is to provide new methods for the manufacture of sulphone compounds with high yields and at minimum cost.

This application is a continuation-in-part of my copending application, Serial No. 422,904, filed December 13, 1941.

The compounds of the invention have the following general formula

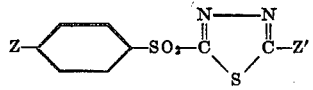

where Z and Z' are members of the class consisting of $NO_2$, $NH_2$ and groups hydrolyzable to $NH_2$. An important compound within the general class is 2,4'-diamino-5-(1,3,4-thiodiazolyl) phenyl sulphone which has been found to be a chemotherapeutic agent of outstanding utility in the treatment of bacterial infections.

The following examples illustrate methods for the preparation of the new class of compounds as well as for certain intermediates.

*Example 1.—Preparation of 2-amino-4'-nitro-5-thiodiazolyl-phenyl sulphide*

Thio-semicarbazide may be prepared by the method of Freund & Schander, Ber. 29 2501 (1896). It may be converted into 2-amino-5-thio-thiodiazole by the method of P. C. Guha, J. A. C. S. 44 1516 (1922).

600 grams of 2-amino-5-thio-thiodiazole is dissolved in 1 liter of water with sufficient alkali and 5 liters of 3-A ethanol are added. 600 grams of p-nitro chlorobenzene is added and the solution refluxed for 40 hours. The solution is cooled and the crystals filtered. The filter cake is suspended in ether to free of p-nitro chlorobenzene and filtered. The filter cake is 2-amino-4'-nitro-5-thiodiazolylphenyl sulphide, having a melting point of 196–200° C. The equation for this reaction is as follows:

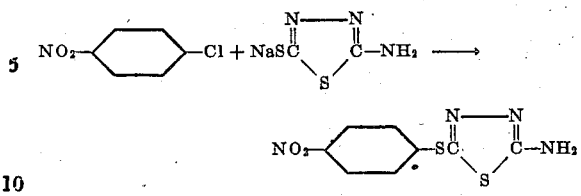

*Example 2.—Preparation of 2-acetylamino-4'-nitro-5-thiodiazolylphenyl sulphone*

700 grams of the product obtained in Example 1 is suspended in a solution of 1.7 liters of acetic anhydride in 6 liters of glacial acetic acid. 1750 cc. of 30% hydrogen peroxide is added portionwise with the temperature rising to 80–90° C. Cooling is instituted to keep the temperature at 80–90° C. When the temperature drops, more $H_2O_2$ is added, the suspension goes into solution and then is recrystallized as formed. After the reaction is complete, the reaction mixture is allowed to stand at 80–90° C. for 2 hours, then cooled and filtered. The product thus obtained is 2-acetylamino-4'-nitro-5-thiodiazolyl phenyl sulphone of melting point 250–254° C. and has the formula

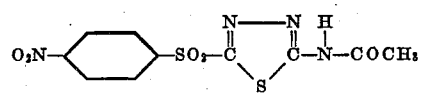

*Example 3.—Preparation of 2-amino-4'-nitro-5-thiodiazolylphenyl sulphone*

The product of Example 2 may be deacetylated by suspending 620 grams in a solution of 4.5 liters of glacial acetic acid, 500 cc. of hydrochloric acid and 500 cc. of water. The mixture is refluxed until complete solution and then 30 minutes longer. The solution is cooled, neutralized to Congo red with dilute alkali and diluted further to precipitate crystalline 2-amino-4'-nitro-5-thiodiazolylphenyl sulphone of melting point 228–232° C.

*Example 4.—Preparation of 2,4'-diamino-5-thiodiazolylphenyl sulphone*

100 grams of ammonium chloride is dissolved in 10 liters of hot water and 600 grams of reduced iron is added with stirring. The suspension is heated at 90–100° C. for ½ hour and then cooled to 70° C. 460 grams of the sulphone obtained in Example 3 is added portion-wise with stirring and cooling so that the temperature does not rise above 80–85° C. 2-octanol may be added to prevent frothing. After all the sulphone is added, the temperature is maintained at 80° C. for two hours. The reaction is cooled and the supernatant liquid is decanted off. The sludge is made alkaline to litmus with alkali and then extracted with an equal volume of hot acetone. The acetone solution is filtered off. The filtrate is reduced in vacuo until all acetone is taken off. The residue is cooled and the pinkish-yellow or flesh-colored crystals are filtered off and dried. When recrystallized from dilute alcohol or other suitable solvent, a product is obtained having a melting point 233–236° C. which is 2,4'-diamino-5-thio-diazolylphenol sulphone.

*Example 5.—Preparation of 2,4'-diacylated diamino-5-thiodiazolylphenyl sulphone*

The product of Example 4 may be diacetylated with acetic anhydride according to known methods for acetylation. Other equivalent acylating agents may also be used thereby obtaining the corresponding compounds in which the amino groups are replaced by groups which are hydrolyzable to amino groups.

What I claim as my invention is:

1. In a process for preparing a sulphone having the formula

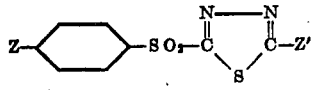

where Z and Z' are members of the class consisting of NO₂, NH₂ and groups hydrolyzable to NH₂, the step which comprises reacting a compound of the formula

with a compound of the formula

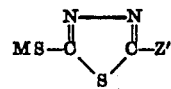

where M is a member of the class consisting of hydrogen and an alkali metal thereby obtaining a compound having the formula

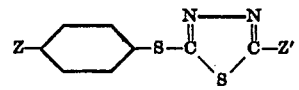

and oxidizing the latter with a reagent capable of converting the sulphide into a sulphone.

2. In a process for obtaining a sulphone, the step of reacting a p-nitro phenyl halide with a 2-amino-5-thio-thiodiazole thereby obtaining 2-amino-4'-nitro-5-thiodiazolylphenyl sulphide.

3. In a process for obtaining a sulphone, the step of reacting a p-nitro phenyl halide with a 2-amino-5-thio-thiodiazole thereby obtaining 2-amino-4'-nitro-5-thiodiazolylphenyl sulphide, and oxidizing the latter with a reagent capable of converting a sulphide to a sulphone.

4. The process for manufacturing 2,4'-diamino-5-thiodiazolylphenyl sulphone which comprises reacting a p-nitro phenyl halide with a 2-amino-5-thio-thiodiazole, oxidizing the 2-amino-4'-nitro-5-thiodiazolylphenyl sulphide thus obtained in the presence of an acylating agent to 2-acylamino-4'-nitro-5-thiodiazolylphenyl sulphone, and deacylating and reducing to obtain 2,4'-diamino-5-thiodiazolylphenyl sulphone.

5. A compound having the formula

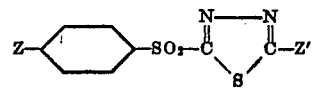

where Z and Z' are members of the class consisting of NO₂, NH₂ and groups hydrolyzable to NH₂.

6. 2,4'-diamino-5-thiodiazolylphenyl sulphone.

LOUIS L. BAMBAS.